US012205511B2

(12) United States Patent
He

(10) Patent No.: US 12,205,511 B2
(45) Date of Patent: Jan. 21, 2025

(54) DISPLAY PANEL, DRIVING METHOD THEREOF, AND ELECTRONIC DEVICE

(71) Applicant: TCL China Star Optoelectronics Technology Co., Ltd., Shenzhen (CN)

(72) Inventor: Jhenwei He, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/603,060

(22) PCT Filed: Aug. 23, 2021

(86) PCT No.: PCT/CN2021/113972
§ 371 (c)(1),
(2) Date: Feb. 23, 2023

(87) PCT Pub. No.: WO2023/019602
PCT Pub. Date: Feb. 23, 2023

(65) Prior Publication Data
US 2024/0054935 A1 Feb. 15, 2024

(30) Foreign Application Priority Data
Aug. 16, 2021 (CN) ........................ 202110936052.X

(51) Int. Cl.
*G09G 3/20* (2006.01)
*G09G 3/36* (2006.01)

(52) U.S. Cl.
CPC ......... *G09G 3/2074* (2013.01); *G09G 3/3607* (2013.01); *G09G 3/3614* (2013.01);
(Continued)

(58) Field of Classification Search
CPC .. G09G 3/2074; G09G 3/3607; G09G 3/3614; G09G 2320/0233; G09G 2320/0242; G09G 2320/0295
See application file for complete search history.

(56) References Cited

U.S. PATENT DOCUMENTS

2008/0136761 A1 6/2008 Hong et al.
2012/0236048 A1* 9/2012 Tseng .................. G09G 3/3651
345/88
(Continued)

FOREIGN PATENT DOCUMENTS

CN 101221716 A 7/2008
CN 107886923 A 4/2018
(Continued)

OTHER PUBLICATIONS

International Search Report in International application No. PCT/CN2021/113972,mailed on May 13, 2022.
(Continued)

*Primary Examiner* — Ryan A Lubit
(74) *Attorney, Agent, or Firm* — Nathan & Associates; Menachem Nathan

(57) ABSTRACT

The present application provides a display panel, a driving method thereof, and an electronic device, wherein the electronic device includes the display panel, and the driving method of the display panel is used to drive the display panel, a driving unit of the display panel drives first sub-pixels and second sub-pixels to display alternately with a first display gray scale and a second display gray scale, and drives third sub-pixels to display with a third gray scale value, so as to alleviate a problem of serious color shift at large viewing angles and improve clarity of a displayed picture.

15 Claims, 4 Drawing Sheets

(52) U.S. Cl.
CPC ............... *G09G 2320/0233* (2013.01); *G09G 2320/0242* (2013.01); *G09G 2320/0295* (2013.01)

(56) References Cited

U.S. PATENT DOCUMENTS

| | | | | |
|---|---|---|---|---|
| 2016/0171943 | A1 | 6/2016 | Baek et al. | |
| 2019/0325837 | A1* | 10/2019 | Chen | G09G 3/3607 |
| 2020/0118513 | A1* | 4/2020 | Chen | G09G 3/3696 |
| 2020/0243027 | A1* | 7/2020 | He | G09G 3/364 |
| 2021/0210032 | A1* | 7/2021 | Li | G09G 3/3607 |
| 2021/0225222 | A1* | 7/2021 | Shim | G09G 3/006 |
| 2021/0358390 | A1* | 11/2021 | Yue | G09G 3/32 |
| 2022/0036839 | A1* | 2/2022 | Chen | G09G 3/3607 |

FOREIGN PATENT DOCUMENTS

| | | | |
|---|---|---|---|
| CN | 107895568 | A | 4/2018 |
| CN | 107945758 | A | 4/2018 |
| CN | 108831399 | A | 11/2018 |
| CN | 109346020 | A | 2/2019 |
| CN | 110910846 | A | 3/2020 |
| CN | 111025791 | A | 4/2020 |
| CN | 111653239 | A | 9/2020 |
| CN | 111798807 | A | 10/2020 |
| CN | 111833787 | A | 10/2020 |
| CN | 112102793 | A | 12/2020 |
| CN | 112180630 | A | 1/2021 |
| CN | 112180631 | A | 1/2021 |
| CN | 112530344 | A | 3/2021 |
| CN | 112669785 | A | 4/2021 |

OTHER PUBLICATIONS

Written Opinion of the International Search Authority in International application No. PCT/CN2021/113972,mailed on May 13, 2022.

Chinese Office Action issued in corresponding Chinese Patent Application No. 202110936052.X dated Apr. 7, 2023, pp. 1-7.

* cited by examiner

DISPLAY PANEL, DRIVING METHOD THEREOF, AND ELECTRONIC DEVICE

BACKGROUND OF INVENTION

Field of Invention

The present invention relates to a field of display technology, and in particular to a display panel, a driving method thereof, and an electronic device.

Description of Prior Art

With development of display technology, resolutions and refresh frequencies of liquid crystal display (LCD) panels are getting higher and higher. A liquid crystal display panel with a resolution of 8K and a refresh frequency of 120 Hz is a mainstream in the future. For the liquid crystal display panel with the resolution of 8K and a refresh frequency of 120 Hz, a number of pixels has greatly increased, but a refresh time of each frame is greatly reduced, which means that a charging time of each row of sub-pixels is greatly reduced. If a conventional pixel structure with one row of sub-pixels using one scan line, and one column of sub-pixels using one data line is adopted, a charging time of each sub-pixels cannot be guaranteed, resulting in insufficient charging and abnormal pictures. Meanwhile, considering product cost, a 4-domain pixel structure has lower cost than an 8-domain pixel structure, but has a problem of serious color shift at large viewing angles which needs to be alleviated.

An existing solution to alleviate the color shift at large viewing angles is to divide multiple sub-pixels in a display panel into two different display states, a high-brightness state and a low-brightness state, and the sub-pixels in the low-brightness state are used to suppress a degree of a brightness change at a side view. The more a number of the sub-pixels in the low-brightness state in a display area is, the better improvement of the color shift is. However, increasing the sub-pixels in the low-brightness state will impact clarity of a displayed picture and produce a grainy feeling.

In summary, existing display panels have a problem that the displayed picture will become grainy when alleviating the color shift at large viewing angles. Therefore, it is necessary to provide a display panel, a driving method of the display panel, and an electronic device to alleviate this defect.

SUMMARY OF INVENTION

Embodiments of the present application provide a display panel, a driving method of the display panel, and an electronic device, which are used to solve a problem of existing display panels that a displayed picture will become grainy when alleviating color shift at large viewing angles.

An embodiment of the present application provides a display panel including a driving unit, a plurality of first sub-pixels, a plurality of second sub-pixels, and a plurality of third sub-pixels;

wherein, in a same frame of picture, the driving unit is configured to drive the first sub-pixels to display with one of a first display gray scale and a second display gray scale, and the driving unit is also configured to drive the second sub-pixels to display with another one of the first display gray scale and the second display gray scale;

wherein, in different frames of pictures, the driving unit is configured to drive the first sub-pixels to display alternately with the first display gray scale and the second display gray scale, the driving unit is further configured to drive the second sub-pixels to display alternately with the first display gray scale and the second display gray scale, and the driving unit is still further configured to drive the third sub-pixels to display with a third gray scale; and wherein the first display gray scale is greater than or equal to the third display gray scale, and the second display gray scale is less than or equal to the third display gray scale.

According to an embodiment of the present application, the display panel further includes:

an acquiring unit configured to acquire an original display gray scale of each of the first sub-pixels, the second sub-pixels, and the third sub-pixels; and a processing unit configured to perform a color shift compensation process according to the original display gray scale of each of the first, the second, and the third sub-pixels to obtain the first display gray scale, the second display gray scale, and the third display gray scale, wherein a ratio of a sum of the first display gray scale and the second display gray scale to the original display gray scale is 2:1.

According to an embodiment of the present application, the display panel has a plurality of repeating units, and the repeating units are composed of the first sub-pixels, the second sub-pixels, and the third sub-pixels; and wherein a ratio of numbers of the first sub-pixels, the second sub-pixels, and the third sub-pixels in a same one of the repeating units is 1:1:2.

According to an embodiment of the present application, the driving unit drives the first sub-pixels to display with the first display gray scale or the second display gray scale every N frames, and the driving unit drives the second sub-pixels to display with the first display gray scale or the second display gray scale every N frames, wherein N is an integer greater than or equal to 1.

According to an embodiment of the present application, when N is equal to 1, a polarity of each of the first sub-pixels is switched once every frame, and a polarity of each of the second sub-pixels is switched once every frame; and wherein when N is greater than or equal to 2, in two adjacent frames of pictures, polarities of the first sub-pixels are different, and polarities of the second sub-pixels are different.

According to an embodiment of the present application, the first display gray scale, the second display gray scale, and the third display gray scale are all greater than or equal to 0 and less than or equal to 255.

Another embodiment of the present application also provides an electronic device, including a display panel, the display panel including a driving unit, a plurality of first sub-pixels, a plurality of second sub-pixels, and a plurality of third sub-pixels;

wherein, in a same frame of picture, the driving unit is configured to drive the first sub-pixels to display with one of a first display gray scale and a second display gray scale, and the driving unit is also configured to drive the second sub-pixels to display with another one of the first display gray scale and the second display gray scale;

wherein in different frames of pictures, the driving unit is configured to drive the first sub-pixels to display alternately with the first display gray scale and the second display gray scale, the driving unit is further configured to drive the second sub-pixels to display alternately with the first display gray scale and the second display gray scale, and the driving unit is still further configured to drive the third sub-pixels to display with a third gray scale; and wherein the first display gray scale is greater than or equal to the third display gray scale, and the second display gray scale is less than or equal to the third display gray scale.

According to an embodiment of the present application, the display panel further includes:

an acquiring unit, configured to acquire an original display gray scale of each of the first sub-pixels, the second sub-pixels, and the third sub-pixel; and a processing unit, configured to perform a color shift compensation process according to the original display gray scale of each of the first, the second, and the third sub-pixels to obtain the first display gray scale, the second display gray scale, and the third display gray scale, wherein a ratio of a sum of the first display gray scale and the second display gray scale to the original display gray scale is 2:1.

According to an embodiment of the present application, the display panel has a plurality of repeating units, and the repeating units is composed of the first sub-pixels, the second sub-pixels, and the third sub-pixels; and wherein a ratio of numbers of the first sub-pixels, the second sub-pixels, and the third sub-pixels in a same one of the repeating units is 1:1:2.

According to an embodiment of the present application, the driving unit drives the first sub-pixels to display with the first display gray scale or the second display gray scale every N frames, the driving unit drives the second sub-pixels to display with the first display gray scale or the second display gray scale every N frames, wherein N is an integer greater than or equal to 1.

According to an embodiment of the present application, when N is equal to 1, a polarity of each of the first sub-pixels is switched once every frame, and a polarity of each of the second sub-pixels is switched once every frame; and wherein when N is greater than or equal to 2, in two adjacent frames of pictures, polarities of the first sub-pixels are different, and polarities of the second sub-pixels are different.

According to an embodiment of the present application, the first display gray scale, the second display gray scale, and the third display gray scale are all greater than or equal to 0 and less than or equal to 255.

Further another embodiment of the present application also provides a method of driving a display panel, and the method of driving the display panel includes:

in a same frame of picture, driving first sub-pixels to display with one of a first display gray scale and a second display gray scale, and driving second sub-pixels to display with another one of the first display gray scale and the second display gray scale;

in different frames of pictures, driving first sub-pixels to display alternately with the first display gray scale and the second display gray scale, driving the second sub-pixels to display alternately with the first display gray scale and the second display gray scale, and driving the third sub-pixels to display with a third gray scale, wherein the first display gray scale is greater than or equal to the third display gray scale, and the second display gray scale is less than or equal to the third display gray scale.

According to an embodiment of the present application, the method of driving the display panel further includes:

acquiring an original display gray scale of each of the first sub-pixels, the second sub-pixels, and the third sub-pixel; and performing a color shift compensation process according to the original display gray scale of each of the first, the second, and the third sub-pixels to obtain the first display gray scale, the second display gray scale, and the third display gray scale, wherein a ratio of a sum of the first display gray scale and the second display gray scale to the original display gray scale is 2:1.

According to an embodiment of the present application, the display panel has a plurality of repeating units, and the repeating units is composed of the first sub-pixels, the second sub-pixels, and the third sub-pixels; and wherein a ratio of numbers of the first sub-pixels, the second sub-pixels, and the third sub-pixels in a same one of the repeating units is 1:1:2.

According to an embodiment of the present application, the driving unit drives the first sub-pixels to display with the first display gray scale or the second display gray scale every N frames, the driving unit drives the second sub-pixels to display with the first display gray scale or the second display gray scale every N frames, wherein N is an integer greater than or equal to 1.

According to an embodiment of the present application, when N is equal to 1, a polarity of each of the first sub-pixels is switched once every frame, and a polarity of each of the second sub-pixels is switched once every frame; and wherein when N is greater than or equal to 2, in two adjacent frames of pictures, polarities of the first sub-pixels are different, and polarities of the second sub-pixels are different.

According to an embodiment of the present application, the first display gray scale, the second display gray scale, and the third display gray scale are all greater than or equal to 0 and less than or equal to 255.

Beneficial effects of embodiments of the present disclosure: embodiments of the present application provide a display panel, a driving method thereof, and an electronic device, wherein the electronic device includes the display panel, and the method of driving the display panel is used to drive the display panel, the display panel includes a driving unit, a plurality of first sub-pixels, a plurality of second sub-pixels, and a plurality of third sub-pixels; wherein, in a same frame of picture, the driving unit is configured to drive the first sub-pixels to display with one of a first display gray scale and a second display gray scale, and the driving unit is also configured to drive the second sub-pixels to display with another one of the first display gray scale and the second display gray scale; wherein, in different frames of pictures, the driving unit is configured to drive the first sub-pixels to display alternately with the first display gray scale and the second display gray scale, the driving unit is further configured to drive the second sub-pixels to display alternately with the first display gray scale and the second display gray scale, and the driving unit is still further configured to drive the third sub-pixels to display with a third gray scale; and wherein the first display gray scale is greater than or equal to the third display gray scale, and the second display gray scale is less than or equal to the third display gray scale. The second sub-pixels and the third sub-pixels with smaller display gray scales are used to reduce a degree of brightness change at a side view, so as to alleviate a problem of serious color shift of the display panel at large viewing angles. In different frames at the same time, the first display gray scale and the second display gray scale are used to alternately drive the first sub-pixels and the second sub-pixels to display respectively, thereby reducing a grainy feeling of the displayed picture and improving clarity of the displayed picture.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

DETAILED DESCRIPTION OF PREFERRED EMBODIMENTS

Figure 1:
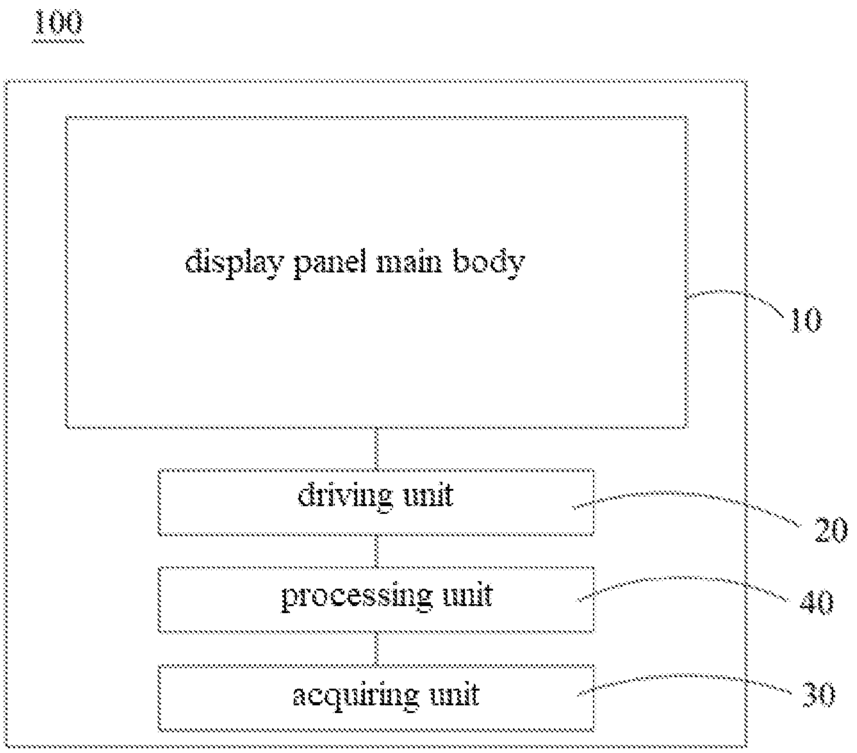
FIG. 1 is a schematic structural diagram of a display panel provided by an embodiment of the present application.

The following description of the various embodiments is provided to illustrate the specific embodiments of the invention. Directional terms mentioned in the present invention, such as "vertical", "horizontal", "upper", "bottom", "pre", "post", "left", "right", "inside", "outside", "side", etc., only refer to the direction of the additional drawing. Therefore, the directional terminology used is for the purpose of illustration and understanding of the invention. In the drawings, structurally similar elements are denoted by the same reference numerals.

The disclosure will be further described below in conjunction with the drawings and specific embodiments:

Embodiments of the present application provide a display panel, a driving method of the display panel, and an electronic device. The electronic device includes the display panel, and the driving method of the display panel is used to drive the display panel.

The electronic device may be a vehicle-mounted display terminal, such as a vehicle-mounted display, a driving recorder, etc., the electronic device may also be a mobile terminal, such as a smart phone, a tablet computer, a notebook computer, etc., or the electronic device may also be a wearable terminal, such as a smart watch, a smart bracelet, smart glasses, a reality-augmented device, etc. The electronic device can also be a fixed terminal, such as a desktop computer, a TV, etc., or a vehicle-mounted display terminal, such as a vehicle-mounted display, a driving recorder, etc.

As shown in FIG. 1, FIG. 1 is a schematic structural diagram of a display panel provided by an embodiment of the present application. The display panel 100 includes a display panel main body 10 and a driving unit 20. The driving unit 20 may be a source driving chip or a source driving circuit, and the driving unit 20 is connected to the display panel main body 10 and used to drive the display panel main body 10 to display a picture.

Figure 2:
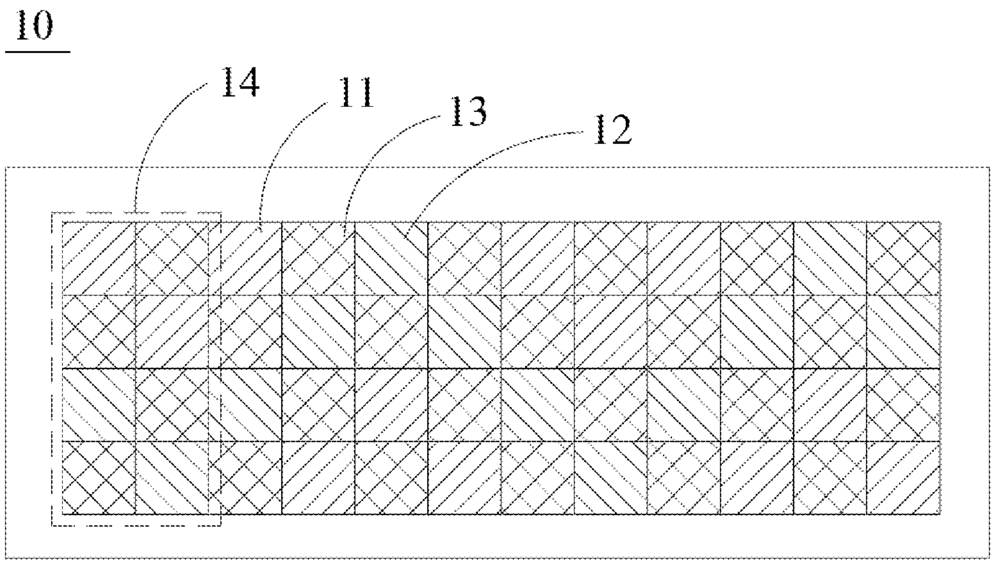
FIG. 2 is a schematic structural diagram of a display panel main body provided by an embodiment of the present application.

As shown in FIG. 2, FIG. 2 is a schematic structural diagram of a display panel main body provided by an embodiment of the present application. The display panel main body 10 includes a plurality of first sub-pixels 11, a plurality of second sub-pixels 12, and a plurality of third sub-pixels 13. The plurality of first sub-pixels 11, the plurality of second sub-pixels 12, and the plurality of third sub-pixels 13 are distributed in multiple rows and multiple columns in a display area of the display panel main body 10.

It should be noted that FIG. 2 only illustrates a positional relationship and distribution of each of the sub-pixels in the display panel main body 10, and a number of each type of the sub-pixels in FIG. 2 does not represent a number of each type of the sub-pixels in the display panel main body 10 in an actual application.

In an embodiment of the present application, colors of the first sub-pixels 11, the second sub-pixels 12, and the third sub-pixels 13 are not particularly limited, and the first sub-pixels 11, the second sub-pixels 12, and the third sub-pixels 13 may all be any one of red sub-pixels, green sub-pixels, and blue sub-pixels. The first sub-pixels 11 may have a same color as the second sub-pixels 12 or the third sub-pixels 13, and the first sub-pixels 11 may also have a different color from the second sub-pixels 12 or the third sub-pixels 13, which is not particularly limited here.

Further, in a same frame of picture, the driving unit is configured to drive the first sub-pixels to display with one of a first display gray scale and a second display gray scale, and the driving unit is also configured to drive the second sub-pixels to display with another one of the first display gray scale and the second display gray scale.

Figure 3:
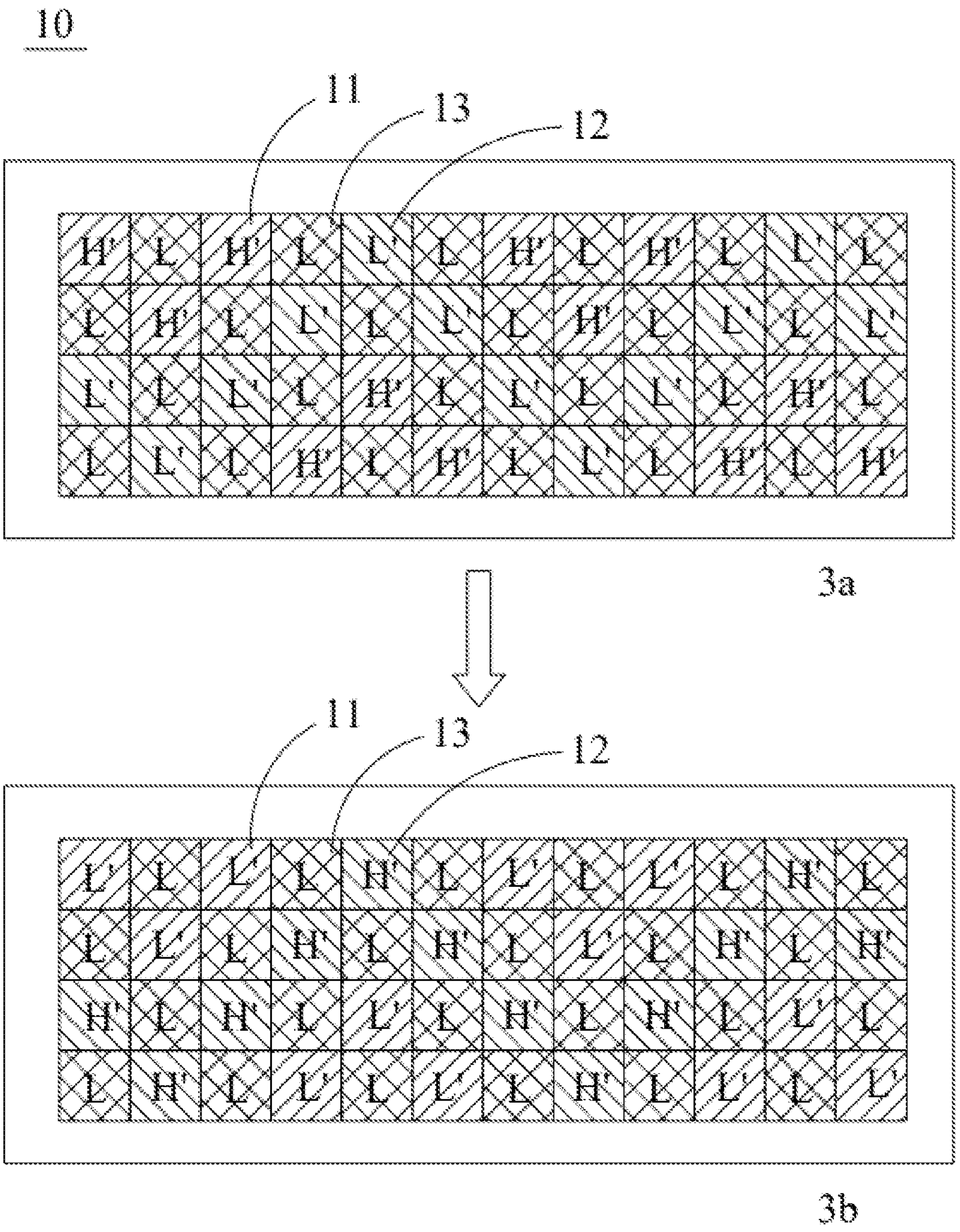
FIG. 3 is a schematic diagram of screen switching of a display panel provided by an embodiment of the present application.

As shown in FIG. 3, FIG. 3 is a schematic diagram of screen switching of a display panel provided by an embodiment of the present application. Taking 3*a* in FIG. 3 as an example, in a picture of a current frame shown in 3*a*, the driving unit 20 drives the first sub-pixels 11 with the first display gray scale H' to display, drives the second sub-pixels 12 with the second display gray scale L' to display, and drives the third sub-pixels with the third display gray scale L to display.

The first display gray scale H' is greater than or equal to the third display gray scale L, and the second display gray scale L' is less than or equal to the third display gray scale L. As such, a difference between the first display gray scale H' and the second display gray scale L' can be greater than or equal to a difference between the first display gray scale H' and the third display gray scale L, so as to further increase a difference in display brightness between a primary color component of the first display gray scale H' with a high gray scale value and a primary color component of the second display gray scale L' with a lower gray scale value, thereby increasing brightness contrast of each primary color component, thus alleviating a problem of serious color shift of the display panel at large viewing angles.

When a picture is switched from a state shown in 3*a* to a state shown in 3*b*, the driving unit 20 drives the first sub-pixels 11 with the second display gray scale L' to display, drives the second sub-pixels 12 with the first display gray scale H' to display, and drives the third sub-pixels 13 with the third display gray scale L to display. As such, in different frames of pictures, each of the first sub-pixels 11 and the second sub-pixels 12 can alternately present two display states with different levels of brightness, that are the first display gray scale H' and the second display gray scale L'. When the display panel 100 is at a higher refresh frequency, such as 90 HZ or 120 HZ, human eyes cannot perceive light-dark switching states of the first sub-pixels 11 and the second sub-pixels 12, so that a grainy feeling of the display screen can be reduced, thereby improving clarity of the display screen.

Further, as shown in FIG. 1, the display panel 100 further includes an acquiring unit 30 and a processing unit 40. The acquiring unit 30 is connected to the processing unit 40, and the processing unit 40 is connected to the driving unit 20.

The acquiring unit 30 is configured to acquire an original display gray scale H of each of the first sub-pixels 11, the second sub-pixels 12, and the third sub-pixels 13, and the processing unit 40 is configured to perform a color shift compensation process according to the original display gray scale of each sub-pixels to obtain the first display gray scale H', the second display gray scale L', and the third display gray scale L.

In an embodiment of the present application, a ratio of a sum of the first display gray scale H' and the second display gray scale L' to the original display gray scale H is 2:1, so that display brightness of the first sub-pixels 11 and the second sub-pixels 12 after being mixed can be kept consistent with the brightness of the first sub-pixels 11 and the second sub-pixels 12 driven with the original display gray scale H.

In an embodiment of the present application, a bit value of the display panel 100 is 8, and the first display gray scale H', the second display gray scale L', and the third display gray scale L are all greater than or equal to 0 and less than or equal to 255. In practical applications, the bit value of the display panel is not particularly limited to 8 in the above embodiment, but can also be 6, 10, etc. Value ranges of the first display gray scale H', the second display gray scale L', and the third display gray scale L needs to be adjusted according to the bit value, which will not be described in detail here.

Further, the display panel 100 has a plurality of repeating units 14, and the repeating units 14 are composed of the first sub-pixels 11, the second sub-pixels 12, and the third sub-pixels 13.

In an embodiment of the present application, as shown in FIG. 2, each of the repeating units 14 is composed of 8 sub-pixels, and the 8 sub-pixels include two first sub-pixels 11, two second sub-pixels 12, and four third sub-pixels 13. A ratio among a number of the first sub-pixels 11, a number of the second sub-pixels 12, and a number of the third sub-pixels 13 is 1:1:2. As such, display brightness of the repeating units 14 driven by the first display gray scale H', the second display gray scale L', and the third display gray scale L after being mixed is same as the brightness of the repeating units 14 driven with the original display gray scale H, so that while alleviating the color shift of the display panel at large viewing angles, it can also ensure that the clarity of the display panel is not affected.

In practical applications, a number of sub-pixels included in the repeating units 14 is not particularly limited to 8 in the above-mentioned embodiment, but can also be a multiple of 4, such as 4, 12, and so on. A, as long as it can satisfied that the ratio among the number of one sub-pixels 11, the number of the second sub-pixels 12, and the number of the third sub-pixels 13 is 1:1:2.

In an embodiment of the present application, as shown in FIG. 2, the repeating units 14 is composed of four rows of sub-pixels in two adjacent columns, and each row is provided with a third sub-pixel 13, and a first sub-pixel 11 or a second sub-pixel 12 adjacent to the third sub-pixel 13. In practical applications, an arrangement of the sub-pixels in the repeating units 14 is not particularly limited to the above-mentioned embodiment, and can also include, but is not limited to, arranging the four third sub-pixels 13 in first two rows, and placing the first sub-pixels 11 and the second sub-pixels 12 in next two rows. Two of the first sub-pixels 11 may be located in a same row, or respectively arranged in adjacent rows and located in a same row as the second sub-pixels 12.

Further, the driving unit 20 drives the first sub-pixels 11 to display with the first display gray scale H' or the second display gray scale L' every N frames, and the driving unit 20 drives the second sub-pixels 12 to display with the first display gray scale H' or the second display gray scale L' every N frames, wherein N is an integer greater than or equal to 1.

In an embodiment, when N is equal to 1, a polarity of the first sub-pixels 11 is switched once every frame, and a polarity of the second sub-pixels 12 is switched every frame.

Figure 4:
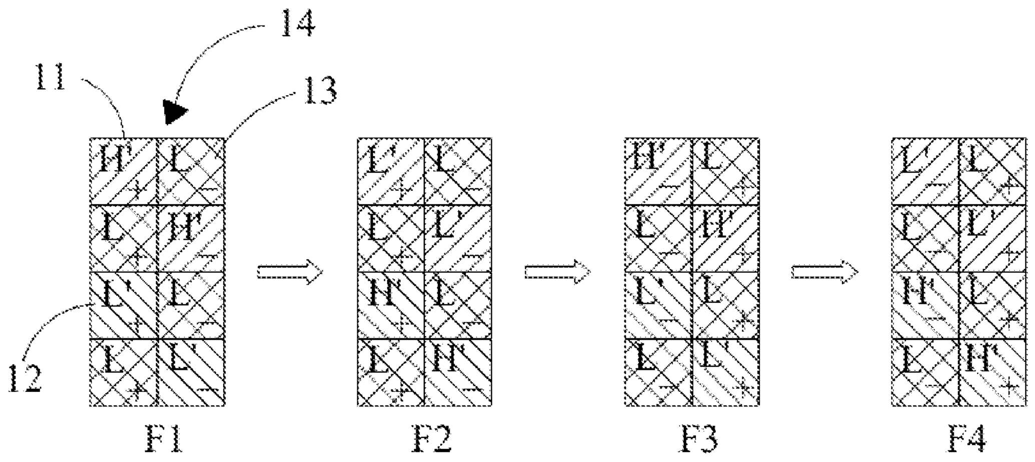
FIG. 4 is a schematic diagram of a first polarity reversal mode provided by an embodiment of the present application.

As shown in FIG. 4, FIG. 4 is a schematic diagram of a first polarity reversal mode provided by an embodiment of the present application. The polarity reversal mode of the display panel in this embodiment is set to be a column inversion. In a first frame of picture F1, in the repeating units 14, polarities of sub-pixels in a first column are all positive (+), and polarities of sub-pixels in a second column are all negative (−); when switching to a second frame of picture F2, the polarities of the sub-pixels in the first column of the repeating units 14 are still all positive (+), and the polarities of the sub-pixels in the second column are still all negative (−); when switching to a third frame of picture F3, in the repeating units 14, the polarities of the sub-pixels in the first column are all switched to negative (−), and the polarities of the sub-pixels in the second column are all switched to positive (+); and when switching to a fourth frame of picture F4, in the repeating units 14, the polarities of the sub-pixels in the first column are all still negative (−), and the polarities of the sub-pixels in the second column are all still positive (+). Above four frames are taken as a cycle to switch the polarities repeatedly.

If N=1, the polarities are switched every frame, and when the first sub-pixels 11 is displayed with the first display gray scale H', the polarities of the first sub-pixels 11 are all positive (+), and when the first sub-pixels 11 is displayed with the second display gray scale L', the polarities of the first sub-pixels are all negative (−). The second sub-pixels 12 have a similar situation to the first sub-pixels 11, and details will not be repeated here for brevity. As such, poor display such as picture sticking may occur on the display panel. Therefore, when N=1, if the polarities of the first sub-pixels 11, the second sub-pixels 12, and the third sub-pixels 13 are switched every frame, when the first sub-pixels 11 and the second sub-pixels 12 are displayed with the first display gray scale H' or the second display gray scale L' in different frames of pictures, the polarities will be changed, so that the display panel can avoid display failure such as the picture sticking.

In an embodiment, when N is greater than or equal to 2, in two adjacent frames of pictures, the polarities of the first sub-pixels are different, and the polarities of the second sub-pixels are different.

Figure 5:
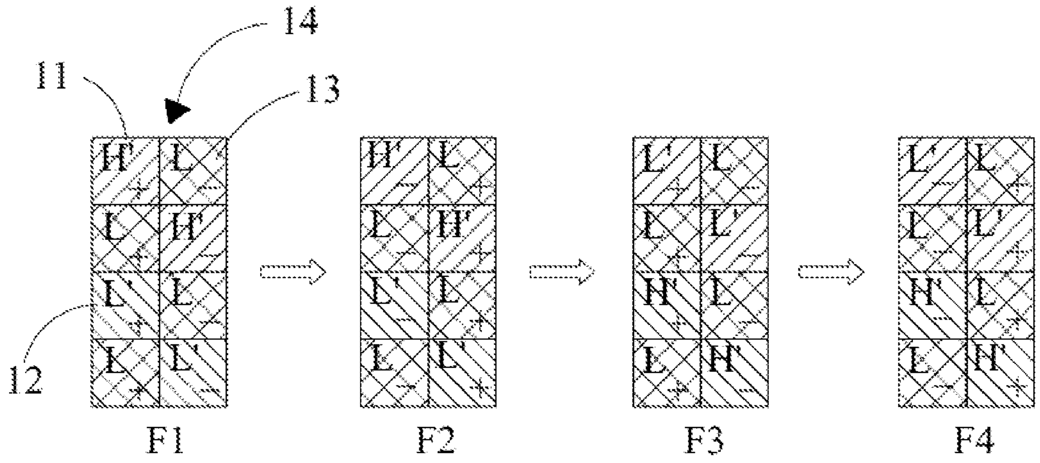
FIG. 5 is a schematic diagram of a second polarity reversal mode provided by an embodiment of the present application.

As shown in FIG. 5, FIG. 5 is a schematic diagram of a second polarity reversal mode provided by an embodiment of the present application. In an embodiment of the present application, N=2, and in the first frame of picture F1, in the repeating units 14, the polarities of the sub-pixels in the first column are all positive (+), and the polarities of the sub-pixels in the second column are all negative (−); and when switching to the second frame of picture F2, the polarities of the sub-pixels in the first column are all switched to negative (−), the polarities of the sub-pixels in the second column are all switched to positive (+). Above two frames are taken as a cycle to switch the polarities repeatedly. As such, if the first sub-pixels 11 in two adjacent frames are all displayed with the first display gray scale H' or the second display gray scale L', the polarities of the first sub-pixels 11 can be changed, thereby preventing poor display such as the picture sticking on the display panel.

When N is an integer greater than 2, the polarity reversal mode of the display panel 100 is same as the polarity reversal mode shown in FIG. 4, and details will not be repeated herein for brevity. In practical applications, the polarity reversal mode of the display panel 100 is not particularly limited to the column inversion in the above-mentioned embodiment, but may also be a row inversion, a dot inversion, a frame inversion, etc., and details will not be repeated herein for brevity.

It should be noted that each of FIGS. 4 and 5 only takes an arbitrary one of the repeating units 14 in the display panel 100 as an example for illustration, and the switching modes of the other repeating units 14 are same as the switching mode of the repeating units 14 shown in FIG. 4 or FIG. 5, and details will not be repeated herein for brevity.

In an embodiment of the present application, the driving method of the display panel includes: in a same frame of picture, driving the first sub-pixels 11 to display with one of the first display gray scale H' and the second display gray scale L', and driving the second sub-pixels 12 to display with another one of the first display gray scale H' and the second display gray scale L'; in different frames of pictures, driving the first sub-pixels 11 to display alternately with the first display gray scale H' and the second display gray scale L', driving the second sub-pixels 12 to display alternately with the first display gray scale H' and the second display gray scale L', and driving the third sub-pixels 13 to display with a third display gray scale L.

In the driving method provided by the embodiment of the present application, the first display gray scale H' is greater than or equal to the third display gray scale L, and the second display gray scale L' is less than or equal to the third display gray scale L.

Figure 6:
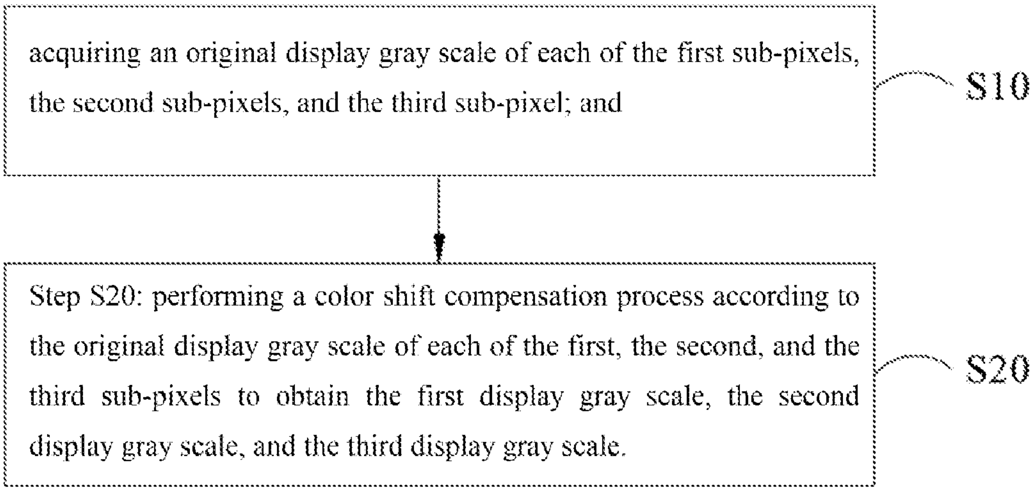
FIG. 6 is a schematic flowchart of a method of driving a display panel provided by an embodiment of the present application

With reference to FIG. 1 to FIG. 6, as shown in FIG. 6, FIG. 6 is a schematic flowchart of a driving method of a display panel according to an embodiment of the present application, and the driving method of the display panel further includes:

Step S10: acquiring an original display gray scale of each of the first sub-pixels, the second sub-pixels, and the third sub-pixel; and Step S20: performing a color shift compensation process on the original display gray scale of each of the first, the second, and the third sub-pixels to obtain the first display gray scale, the second display gray scale, and the third display gray scale.

In an embodiment of the present application, a ratio of a sum of the first display gray scale and the second display gray scale to the original display gray scale is 2:1.

In an embodiment of the present application, the display panel 100 has a plurality of repeating units 14, and the repeating units 14 is composed of the first sub-pixels 11, the second sub-pixels 12, and the third sub-pixels 13.

A ratio among a number of the first sub-pixels 11, a number of the second sub-pixels 12, and a number of the third sub-pixels 13 in a same repeating units 14 is 1:1:2.

In an embodiment of the present application, the driving method of the display panel further includes:

Step S30: driving the first sub-pixels 11 to display with the first display gray scale H' or the second display gray scale L' every N frames, and driving the second sub-pixels 12 to display with the first display gray scale H' or the second display gray scale L' every N frames, wherein N is an integer greater than or equal to 1.

In the step S30 of an embodiment of the present application, when N is equal to 1, a polarity of each of the first sub-pixels 11 is switched once every frame, and a polarity of each of the second sub-pixels 12 is switched once every frame.

In the step S30 of an embodiment of the present application, when N is greater than or equal to 2, in two adjacent frames of pictures, polarities of the first sub-pixels 11 are different, and polarities of the second sub-pixels 12 are different.

In an embodiment of the present application, the first display gray scale H', the second display gray scale L', and the third display gray scale L are all greater than or equal to 0 and less than or equal to 255.

Beneficial effects of embodiments of the present application: embodiments of the present application provide a display panel, a driving method thereof, and an electronic device, wherein the electronic device includes the display panel, and the driving method of the display panel is used to drive the display panel, the display panel includes a driving unit, a plurality of first sub-pixels, a plurality of second sub-pixels, and a plurality of third sub-pixels; wherein, in a same frame of picture, the driving unit is configured to drive the first sub-pixels to display with one of a first display gray scale and a second display gray scale, and the driving unit is also configured to drive the second sub-pixels to display with another one of the first display gray scale and the second display gray scale; wherein, in different frames of pictures, the driving unit is configured to drive the first sub-pixels to display alternately with the first display gray scale and the second display gray scale, the driving unit is further configured to drive the second sub-pixels to display alternately with the first display gray scale and the second display gray scale, and the driving unit is still further configured to drive the third sub-pixels to display with a third gray scale value; and wherein the first display gray scale is greater than or equal to the third display gray scale, and the second display gray scale is less than or equal to the third display gray scale. The second sub-pixels and the third sub-pixels with smaller display gray scales are used to reduce a degree of brightness change at a side view, so as to alleviate a problem of serious color shift of the display panel at large viewing angles. In different frames at the same time, the first display gray scale and the second display gray scale are used to alternately drive the first sub-pixels and the second sub-pixels to display respectively, thereby reducing a grainy feeling of the displayed picture and improving clarity of the displayed picture.

While the invention has been described by way of example and in terms of the preferred embodiments, it is to be understood that the invention is not particularly limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A display panel, comprising a driving unit, a plurality of first sub-pixels, a plurality of second sub-pixels, and a plurality of third sub-pixels;

wherein, in a same frame of picture, the driving unit is configured to drive the first sub-pixels to display with one of a first display gray scale and a second display gray scale, and the driving unit is also configured to drive the second sub-pixels to display with another one of the first display gray scale and the second display gray scale;

wherein, in different frames of pictures, the driving unit is configured to drive the first sub-pixels to display alternately with the first display gray scale and the second display gray scale, the driving unit is further configured to drive the second sub-pixels to display alternately with the first display gray scale and the second display gray scale, and the driving unit is still further configured to drive the third sub-pixels to display with a third gray scale value;

wherein the first display gray scale is greater than or equal to a third display gray scale, and the second display gray scale is less than or equal to the third display gray scale;

wherein the display panel has a plurality of repeating units, and the repeating units are composed of the first sub-pixels, the second sub-pixels, and the third sub-pixels; and wherein a ratio of numbers of the first sub-pixels, the second sub-pixels, and the third sub-pixels in a same one of the repeating units is 1:1:2.

2. The display panel according to claim 1, wherein the display panel further comprises:

an acquiring unit configured to acquire an original display gray scale of each of the first sub-pixels, the second sub-pixels, and the third sub-pixels; and a processing unit configured to perform a color shift compensation process on the original display gray scale of each of the first, the second, and the third sub-pixels to obtain the first display gray scale, the second display gray scale, and the third display gray scale, wherein a ratio of a sum of the first display gray scale and the second display gray scale to the original display gray scale is 2:1.

3. The display panel according to claim 1, wherein the driving unit drives the first sub-pixels to display with the first display gray scale or the second display gray scale every N frames, and the driving unit drives the second sub-pixels to display with the first display gray scale or the second display gray scale every N frames, and wherein N is an integer greater than or equal to 1.

4. The display panel according to claim 3, wherein when N is equal to 1, a polarity of each of the first sub-pixels is switched once every frame, and a polarity of each of the second sub-pixels is switched once every frame; and wherein when N is greater than or equal to 2, in two adjacent frames of pictures, the polarities of the first sub-pixels are different, and the polarities of the second sub-pixels are different.

5. The display panel according to claim 1, wherein the first display gray scale, the second display gray scale, and the third display gray scale are all greater than or equal to 0 and less than or equal to 255.

6. An electronic device, comprising a display panel, the display panel comprising a driving unit, a plurality of first sub-pixels, a plurality of second sub-pixels, and a plurality of third sub-pixels;

wherein, in a same frame of picture, the driving unit is configured to drive the first sub-pixels to display with one of a first display gray scale and a second display gray scale, and the driving unit is also configured to drive the second sub-pixels to display with another one of the first display gray scale and the second display gray scale;

wherein in different frames of pictures, the driving unit is configured to drive the first sub-pixels to display alternately with the first display gray scale and the second display gray scale, the driving unit is further configured to drive the second sub-pixels to display alternately with the first display gray scale and the second display gray scale, and the driving unit is still further configured to drive the third sub-pixels to display with a third gray scale value;

wherein the first display gray scale is greater than or equal to a third display gray scale, and the second display gray scale is less than or equal to the third display gray scale;

wherein the display panel has a plurality of repeating units, and the repeating units is composed of the first sub-pixels, the second sub-pixels, and the third sub-pixels; and wherein a ratio of numbers of the first sub-pixels, the second sub-pixels, and the third sub-pixels in a same one of the repeating units is 1:1:2.

7. The electronic device according to claim 6, wherein the display panel further comprises:

an acquiring unit configured to acquire an original display gray scale of each of the first sub-pixels, the second sub-pixels, and the third sub-pixel; and a processing unit configured to perform a color shift compensation process on the original display gray scale of each of the first, the second, and the third sub-pixels to obtain the first display gray scale, the second display gray scale, and the third display gray scale, wherein a ratio of a sum of the first display gray scale and the second display gray scale to the original display gray scale is 2:1.

8. The electronic device according to claim 6, wherein the driving unit drives the first sub-pixels to display with the first display gray scale or the second display gray scale every N frames, the driving unit drives the second sub-pixels to display with the first display gray scale or the second display gray scale every N frames, and wherein N is an integer greater than or equal to 1.

9. The electronic device according to claim 8, wherein when N is equal to 1, a polarity of each of the first sub-pixels is switched once every frame, and a polarity of each of the second sub-pixels is switched once every frame; and wherein when N is greater than or equal to 2, in two adjacent frames of pictures, the polarities of the first sub-pixels are different, and the polarities of the second sub-pixels are different.

10. The electronic device according to claim 6, wherein the first display gray scale, the second display gray scale, and the third display gray scale are all greater than or equal to 0 and less than or equal to 255.

11. A driving method of a display panel, the driving method of the display panel comprising:

in a same frame of picture, driving first sub-pixels to display with one of a first display gray scale and a second display gray scale, and driving second sub-pixels to display with another one of the first display gray scale and the second display gray scale;

in different frames of pictures, driving the first sub-pixels to display alternately with the first display gray scale and the second display gray scale, driving the second sub-pixels to display alternately with the first display gray scale and the second display gray scale, and driving the third sub-pixels to display with a third gray scale value, wherein the first display gray scale is greater than or equal to a third display gray scale, and the second display gray scale is less than or equal to the third display gray scale;

wherein the display panel has a plurality of repeating units, and the repeating units is composed of the first sub-pixels, the second sub-pixels, and the third sub-pixels; and wherein a ratio of numbers of the first sub-pixels, the second sub-pixels, and the third sub-pixels in a same one of the repeating units is 1:1:2.

12. The driving method of the display panel according to claim 11, wherein the driving method of the display panel further comprises:

acquiring an original display gray scale of each of the first sub-pixels, the second sub-pixels, and the third sub-pixel; and performing a color shift compensation process on the original display gray scale of each of the first, the second, and the third sub-pixels to obtain the first display gray scale, the second display gray scale, and the third display gray scale, wherein a ratio of a sum of the first display gray scale and the second display gray scale to the original display gray scale is 2:1.

13. The method of driving the display panel according to claim 11, wherein the first sub-pixels are driven to display with the first display gray scale or the second display gray scale every N frames, the second sub-pixels are driven to display with the first display gray scale or the second display gray scale every N frames, and wherein N is an integer greater than or equal to 1.

14. The method of driving the display panel according to claim 13, wherein when N is equal to 1, a polarity of each of the first sub-pixels is switched once every frame, and a polarity of each of the second sub-pixels is switched once every frame; and wherein when N is greater than or equal to 2, in two adjacent frames of pictures, polarities of the first sub-pixels are different, and polarities of the second sub-pixels are different.

15. The method of driving the display panel according to claim 11, wherein the first display gray scale, the second display gray scale, and the third display gray scale are all greater than or equal to 0 and less than or equal to 255.

* * * * *